Patented Sept. 5, 1933

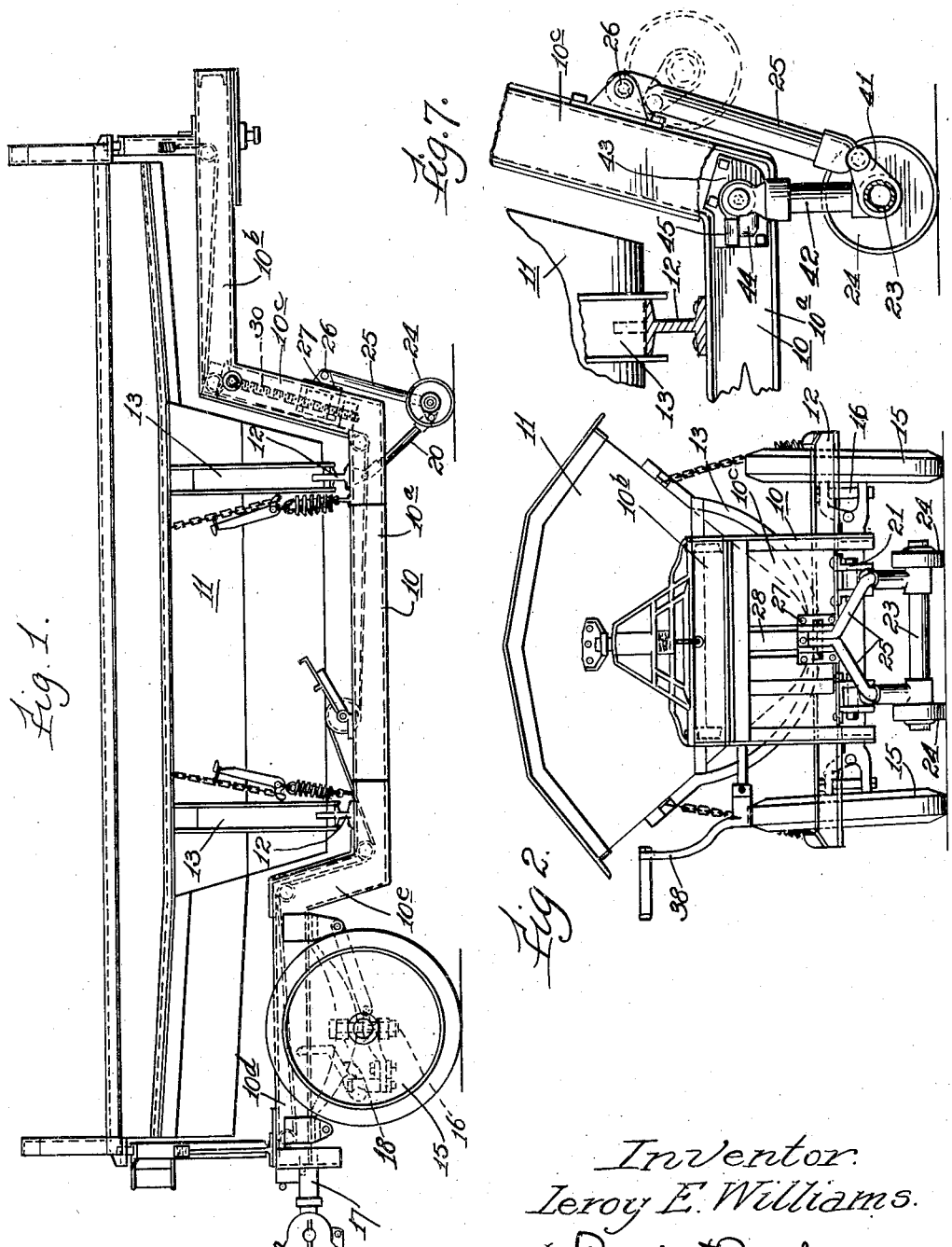

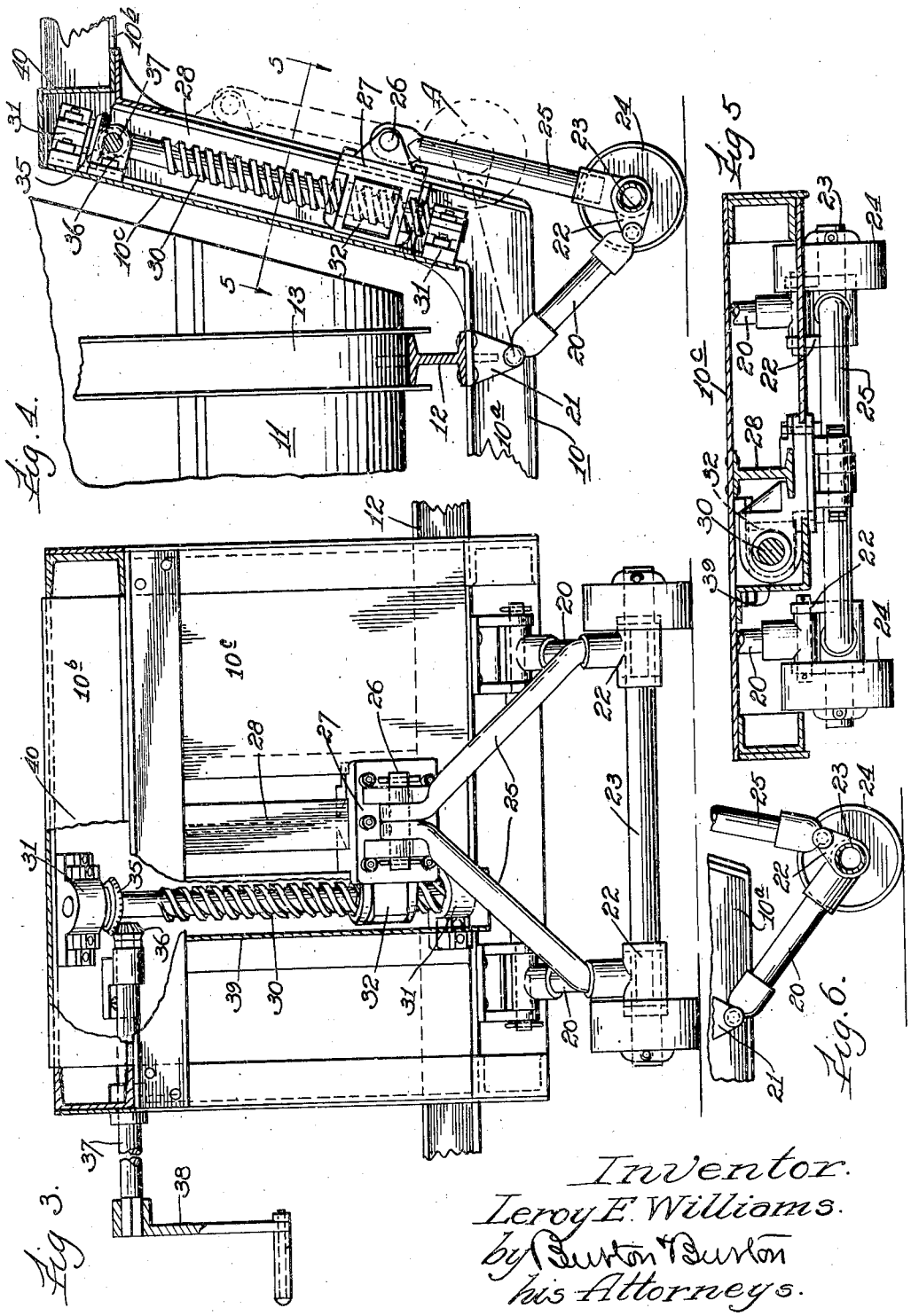

1,925,827

UNITED STATES PATENT OFFICE 1,925,827

JACK FOR SEMITRAILERS

Leroy E. Williams, Edgerton, Wis., assignor to Highway Trailer Company, Edgerton, Wis., a corporation of Wisconsin Application March 13, 1931. Serial No. 522,204

11 Claims. (Cl. 280—33.1)

The present invention relates to semi-trailer vehicles, and deals particularly with the problem of providing suitable frame and running gear for vehicles of this type having a drop frame in which the main or effective load-supporting portion is normally disposed in close proximity to the ground. An important use of such a drop frame is in connection with a laterally tilting or rolling hopper body which is preferably carried close to the ground both for keeping its center of gravity as low as possible and for bringing its edge fairly close to the ground when it is rolled over on its side for discharging the load. When a vehicle of this type is designed as a semi-trailer adapted to be uncoupled from the tractor it is necessary to provide a temporary jack or load support for the front end, and one of the main objects of this invention is to furnish such a support designed to be quickly and easily actuated for movement to and from operative position, and which is constructed and arranged for lifting its ground-engaging elements at least as high as the under side of the drop frame when said supports are disposed at inoperative position. Another object is to provide means for shielding the operating mechanism of the temporary supports from the elements, and from mud, snow or water thrown up from the road so as to insure free and easy operation of the mechanism at all times. And a further object is to provide a vehicle of this character with dirigible supporting wheels at the rear end of the trailer frame for certain purposes herein more fully explained. The invention consists in certain features and elements of construction in combination as herein shown and described, and as indicated by the claims.

In the drawings:

Figure 1 is a view in side elevation of a semi-trailer vehicle provided with a drop frame for supporting a laterally tiltable dump body, and including a temporary support which is a feature of the present invention.

Figure 2 is a front elevation of the vehicle showing the temporary support in operative position.

Figure 3 is an enlarged fragmentary front end view of the trailer frame showing the temporary support in operative position with parts in section to show details of construction.

Figure 4 is a vertical section taken through the temporary supporting structure substantially at the longitudinal center line of the vehicle.

Figure 5 is a transverse sectional view taken substantially as indicated at line, 5—5, on Figure 4.

Figure 6 is a detail view showing a slightly modified form of connection of the supporting struts and control links with the ground-engaging wheels of the temporary support.

Figure 7 is a fragmentary view similar to Figure 4, showing a further modified construction wherein the supporting strut reaches a substantially vertical position in assuming the load at the front end of the trailer frame.

In the construction illustrated in the drawings, the semi-trailer includes a drop-frame indicated generally at 10, having an upwardly or vertically offset longitudinally extending portion, 10$^b$, at its front end which is connected to the main effective load supporting portion, 10$^a$, of the frame by an upwardly extending oblique frame portion indicated at 10$^c$. The present invention is particularly concerned with the problem of providing a temporary load support for the front end of a semi-trailer vehicle of this character wherein the effective load supporting portion of the frame, such as indicated at 10$^a$, is normally disposed relatively close to the ground with a minimum ground clearance. A construction of this character may be advantageously employed in connection with a laterally tiltable dump body, as indicated at 11. For this purpose the main frame portion, 10$^a$, is provided with longitudinally spaced transversely extending rails or tracks, 12, with which co-operate the curved dumping rockers, 13, surrounding the intermediate portion of the body and by virtue of which the body may be rolled laterally to either side into dumping position. As shown in Figure 1 of the drawings the rear end of the trailer frame is preferably formed with a vertically offset longitudinally extending upper portion indicated at 10$^d$, connected to the main frame portion, 10$^a$, by an oblique upwardly extending portion, 10$^e$, providing a conventional type of construction, for connection with the usual supporting wheels indicated at 15, at the rear end of the trailer.

As is generally understood, vehicles of this character are especially adaptable for refuse collection wherein it is ordinarily necessary that the vehicle be drawn short distances and at a comparatively slow rate of speed until a load is accumulated, and in this case the semi-trailer could be hauled slowly by using horse-drawn two-wheel dolly (not shown); then parking the trailer when fully loaded, and picking it up with a tractor for long haul to the city dump. To further assist in convenient use of a vehicle of this character,—the rear supporting wheels may be dirigibly mounted on knuckle pivots as indicated at 16 in Figure 2 so that the vehicle may be easily and quickly manipulated in cramped quarters, as in turning corners in comparatively narrow streets or alleyways. The drawbar, 17, is connected by suitable control linkage indicated at 18, to said knuckle pivots for effecting the steering of the rear wheels by swinging the drawbar laterally, and for temporary manipulation an extension bar or handle (not shown) may be inserted in the coupler head of the drawbar, 17. It may also be convenient when the trailer is detached from the tractor to insert a tongue in the coupler head of the draw bar, 17, for moving the trailer about, the forward end being temporarily supported at such times on small wheels, 24, which will presently be described. Any suitable type of centering lock may be provided for holding the draw bar at straight-ahead position, except when the steering gear is being thus manipulated.

When a trailer is constructed with a drop frame such as that shown at 10, there is not sufficient clearance between the portions, 10ª, and the road surface for accommodating a temporary support of the usual type, for although there may be sufficient room between the frame and the ground for the usual ground-engaging elements, such as the wheel shown at 24, there is only room for raising these wheels a few inches—not enough for safe road clearance when the trailer is drawn by its tractor. I have therefore designed a temporary support arranged for adjustment of the wheels, 24, to a position above the bottom of the frame, 10, so that the presence of the wheels, 24, when raised, will not reduce the clearance at all. My improved structure includes a pair of transversely spaced obliquely extending struts, 20, whose upper ends are pivoted to brackets, 21, secured to the front dumping rail, 12, on the frame portion, 10ª, as seen in Figure 4. The opposite or lower ends of said obliquely extending struts are pivotally connected to supporting brackets, 22, in which is journaled a transversely extending tubular shaft, 23, the outer ends of which are provided with ground-engaging elements, herein shown as the wheels, 24. Rigidly connected with the supporting brackets, 22, are a pair of upwardly extending control links, 25, whose upper ends converge toward each other and are pivotally connected at 26 to a vertically movable carriage, 27, which is guided throughout a limited range of vertical movement by embracing the flange of an I-beam guide indicated at 28, which is rigidly secured to the oblique frame portion, 10ᶜ.

The means for controlling the operation of the temporary support includes an upwardly extending screw, 30, journaled at its opposite ends in bearings, 31, secured to the oblique frame portion, 10ᶜ, adjacent and parallel to said I-beam. Axially movable along said screw is a nut, 32, which is enclosed in said carriage, whereby rotation of the screw causes said nut and carriage to be vertically moved, thereby moving the ground-engaging wheels, 24, into and out of operative position. The screw, 30, may be rotated in any convenient manner, and herein I have shown bevel gears, 35, and 36, driven by the transversely extending operating shaft, 37, journaled in the frame, 10ᶜ, and having a handle, 38, at its outer end at the side of the trailer frame for manipulation at will. A vital feature of the present invention results from the proportioning and location of the respective elements of the temporary support by means of which the ground-engaging wheels, 24, may be moved to the position indicated in dotted lines at A in Figure 4, so as to be disposed above the lower plane of the main portion, 10ª, of said frame, thus insuring that the temporary supports will be raised to a height affording the same clearance as is determined by the distance of said main frame portion, 10ª, above the ground.

It will be manifest that in this particular construction the operating mechanism for the temporary supports is disposed at such a position that it would normally be exposed to and perhaps receive considerable dirt, mud, snow, etc., which would be thrown thereagainst by centrifugal force from the rear wheels of the tractor when the vehicles are coupled and in use; and during the winter, water, snow and ice being thrown directly on the screw and gearing may freeze on these elements so as to render it exceedingly difficult to operate the jacks. To overcome this difficulty the screw is completely encased in a housing, 39, secured to the obliquely extending frame portion, 10ᶜ, as may be seen in Figure 5 of the drawings. The bevel gearing at the upper end of the screw is also shielded from the elements by a housing consisting of a piece of sheet metal indicated at 40 bent and formed as seen in Figures 3 and 4, to extend transversely across the upwardly offset frame portion, 10ᵇ, thus completely enclosing the bevel gears.

Figure 6 discloses a slightly modified form of connection of the struts and the controlling links to the ground-engaging wheels, 24. In this construction the lower end of the strut, 20, is rigidly associated with the bracket bearing, 22, and the lower end of the control link, 25, is pivoted to this bracket, which provides a construction substantially the reverse of that shown in Figure 4.

In the construction shown in Figure 7, the control links, 25, are also pivoted at their lower ends to the bearing brackets, 41, for supporting the shaft, 23, and the struts or supporting legs indicated at 42, are rigidly associated with the bearing brackets, 41. The struts, 42, extend in substantially upright vertical position when at operative load supporting position and are pivoted at their upper ends to brackets indicated at 43 on the main frame portion, 10ª, adjacent its connection with the oblique frame portion, 10ᶜ. This construction has the advantage of permitting substantially the entire load at the front end of the trailer to be carried directly by the supporting leg members, 42. The upper ends of said legs, 42, are formed with rearwardly extending lugs, 44, adapted to engage co-operatively formed lugs, 45, on the brackets, 43, for limiting the rearward movement of the supporting legs, 42, beyond vertical position when they are moved to operative position.

It will be readily appreciated that as compared with four-wheel trailer equipment the semi-trailer permits of operation at somewhat higher speeds with safety, and because its weight contributes to the traction of the tractor vehicle the same load can be hauled with a somewhat lighter power plant. Particularly for small systems having several types of municipal equipment, none of which are in use all the time, this form of trailer permits the same tractor to be employed for alternatively hauling the several trailer vehicles. For example, one may be a sprinkling cart, another a roadsweeper, and a third may be a drop frame hopper body of the type shown herein for collecting ashes or garbage.

Although I have shown and described a particular embodiment of my present invention, it is to be understood that it is capable of modification and rearrangement of the parts without departing from the spirit and scope thereof. I do not therefore wish to be understood as limiting myself to the specific form shown and described, except as limited in the appended claims.

I claim:—

1. In combination with a semi-trailer having a drop-frame including upper and lower longitudinally extending frame portions and upwardly extending frame members connecting said spaced portions, a temporary load support adjacent the front end of the frame, including a pair of transversely spaced struts pivotally connected at their upper ends to the lower frame portion, ground-engaging elements carried at the other ends of said struts, upwardly extending control links connected at their lower ends to said ground-engaging elements, their upper ends converging toward each other and disposed forwardly of said upwardly extending frame members, and operating means including a rotatable screw journaled in upright position on said upwardly extending frame members, a nut axially movable along said screw, and a carriage associated with and vertically movable by said nut in response to rotation of the screw, said carriage having pivotal connection with the upper ends of said control links, whereby said ground-engaging elements may be moved into and out of operative position.

2. In combination with a semi-trailer having a drop-frame including upper and lower longitudinally extending frame portions and upwardly extending frame members connecting said spaced portions, a temporary load support adjacent the forward end of the trailer frame including a pair of transversely spaced struts pivotally connected at their upper ends to said lower frame portion, a transversely extending shaft, supporting brackets on said shaft pivotally connected to the lower ends of said struts, ground-engaging elements carried at the outer ends of said shaft, upwardly extending control links rigidly connected at their lower ends to said supporting brackets having their upper ends converging toward each other and disposed forwardly of said upwardly extending frame members, and operating means including a rotatable screw journaled in upright position on said upwardly extending frame members, a nut axially movable along said screw, and a carriage associated with and vertically movable by said nut in response to rotation of the screw, said carriage having pivotal connection with the upper ends of said control links, whereby said ground-engaging elements may be moved into and out of operative position.

3. In combination with a semi-trailer having a drop-frame including upper and lower longitudinally extending frame portions and upwardly extending frame members connecting said spaced portions, a temporary load support including a pair of transversely spaced struts pivotally connected at their upper ends to said lower frame portion, a transversely extending shaft, supporting brackets disposed adjacent the ends of said shaft and rigidly connected to the lower ends of said struts, ground-engaging elements carried at the outer ends of said shaft, upwardly extending control links pivotally connected at their lower ends to said supporting brackets, having their upper ends converging toward each other and disposed forwardly of said upwardly extending frame members, and operating means including a rotatable screw journaled in upright position on said upwardly extending frame members, a nut axially movable along said screw, and a carriage associated with and vertically movable by said nut in response to rotation of the screw, said carriage having pivotal connection with the upper ends of said control links, whereby said ground-engaging elements may be moved into and out of operative position.

4. In combination with a semi-trailer having a drop-frame including vertically spaced longitudinally extending frame portions and an upwardly and obliquely extending frame portion connecting said spaced longitudinal portions, the lower longitudinal frame portion providing the effective load-supporting area and being normally disposed in running position close to the ground, a temporary load support for the forward end of said trailer including a pair of transversely spaced struts pivotally connected at their upper ends to said lower frame portion, ground-engaging elements carried at the lower ends of said struts, upwardly extending control links connected at their lower ends to said ground engaging elements with their upper ends converging toward each other, an upwardly extending guide member carried on said oblique frame portion, a carriage vertically slidable along said guide and pivotally connected to the upper ends of said control links, and operating means including a rotatable screw journaled in upright position on said oblique frame portion adjacent said guide, a nut movable along said screw and associated with said carriage and means for rotating the screw, for causing shifting of said carriage vertically along the guide to move the ground-engaging elements into and out of operative position.

5. In combination with a semi-trailer having a drop-frame including upper and lower longitudinally extending frame portions and an oblique upwardly extending frame portion connecting said vertically spaced portions, a temporary load support adjacent the front end of the trailer frame including a pair of transversely spaced supporting legs pivotally connected at their upper ends adjacent said obliquely extending frame portion and normally disposed in substantially vertical upright position when in operative position, ground-engaging elements carried at the lower ends of said legs, upwardly extending control links connected at their lower ends to said ground-engaging elements and having their upper ends converging toward each other and disposed adjacent and in front of said oblique upwardly extending frame portion, operating means including a rotatable screw journaled in upright position on said oblique frame portion, a nut axially movable along said screw, and a carriage associated with and vertically movable by said nut in response to rotation by the screw, said carriage being connected to the upper ends of said control links, whereby the ground-engaging elements may be moved into and out of operative position.

6. In the construction defined in claim 5, the upper portion of said supporting leg members and said frame portion having co-operating stop shoulders for preventing movement of said supporting legs rearwardly beyond normally upright supporting position.

7. In the construction defined in claim 1, a housing connected to said upwardly extending frame members and arranged for substantially enclosing said operating screw.

8. In combination with a semi-trailer having a drop-frame including an upper and lower longitudinally extending frame portion and an obliquely extending frame portion connecting said spaced frame portions, a temporary load support adjacent the forward end of the trailer frame and including a pair of upwardly extending control links disposed forwardly of said oblique frame portion, ground-engaging elements carried at the lower ends of said control links, operating means including a rotatable screw journaled in upright position on said upwardly extending frame portion, an axially movable nut carried on said screw, a carriage associated with said nut and vertically movable therewith, said carriage having connection to the upper ends of said control links for moving the ground-engaging elements into and out of operative position, gearing associated with the upper end of said screw for rotating it, a protective shield on said upwardly extending frame portion for substantially encasing said screw, and means secured to one of said frame portions for enclosing said gearing.

9. In combination with a semi-trailer having a drop-frame including vertically spaced longitudinally extending frame portions and an upwardly extending frame portion connecting said spaced portions, a temporary support adjacent the forward end of the trailer including a pair of upwardly extending control links, ground-engaging elements carried at the lower ends of said links, an operating screw disposed in upright position and journaled on said connecting frame portion, a nut vertically movable along said screw, and a carriage associated and vertically movable with said nut, said carriage having connection to the upper ends of said control links for moving the ground-engaging elements into and out of operative position.

10. In combination with a semi-trailer having a drop frame, having upper and lower longitudinal frame portions and upwardly extending frame members connecting said spaced portions, a temporary load support adjacent the front end of the frame including a pair of transversely spaced struts pivotally connected at their upper ends to the lower frame portion, ground engaging elements carried at the other ends of said struts, upwardly extending control links connected at their lower ends to said ground engaging elements, and means associated with said control links for swinging the struts about their pivotal connections for disposing the ground engaging elements above the lowest level of the lower frame portion.

11. In combination, a semi-trailer having a drop frame including upper and lower longitudinally extending frame portions and upward extending frame members connecting said upper and lower frame portions, a load support adjacent the front end of the frame including a pair of transversely spaced struts pivotally connected at their upper ends to the lower frame portion; ground-engaging elements carried at the other ends of said struts; upwardly extending control links connected at their lower ends to said ground engaging elements, the upper ends of said links converging toward each other and disposed forwardly of said upwardly extending frame members.

LEROY E. WILLIAMS.